United States Patent [19]
Yukihiro et al.

[11] Patent Number: 4,733,254
[45] Date of Patent: Mar. 22, 1988

[54] THERMAL HEAD AND IMAGE FORMING APPARATUS USING THE SAME

[75] Inventors: Hayamitu Yukihiro, Yokohama; Kunihiko Miura, Hiratsuka; Takefumi Nosaki, Yokohama, all of Japan

[73] Assignee: Kabushiki Kaisha Toshiba, Kawasaki, Japan

[21] Appl. No.: 921,271

[22] Filed: Oct. 21, 1986

[30] Foreign Application Priority Data

Oct. 31, 1985 [JP] Japan ............................ 60-244307

[51] Int. Cl.[4] ............................................ G01D 15/10
[52] U.S. Cl. ........................... 346/140 R; 346/76 PH; 219/216; 400/120
[58] Field of Search ............ 346/76 PH, 76 L, 140 R, 346/75; 219/216 PH; 400/120

[56] References Cited

U.S. PATENT DOCUMENTS 4,298,786 11/1981 Marciniec .................. 346/76 PH X
4,506,272 3/1985 Arai ............................... 346/76 PH

FOREIGN PATENT DOCUMENTS 60-19550 6/1985 Japan .

*Primary Examiner*—E. A. Goldberg
*Assistant Examiner*—Linda M. Peco
*Attorney, Agent, or Firm*—Oblon, Fisher, Spivak, McClelland & Maier

[57] ABSTRACT

A thermal head employed in a printer includes a plurality of heating elements which are mounted on a molybdenum rod arranged at the edge portion of an aluminum plate. A plurality of drive integrated circuits, mounted on the aluminum plate, control the heating elements in response to an image signal through lead electrodes formed on the circumferential surface of the molybdenum rod. Connecting portions of the lead electrodes and integrated circuits are electrically connected through a polyimide film where electric wiring patterns are formed. In order to use the laser bonding process, these connecting portions of the lead electrodes and integrated circuits are flush with one another.

18 Claims, 22 Drawing Figures

THERMAL HEAD AND IMAGE FORMING APPARATUS USING THE SAME

BACKGROUND OF THE INVENTION

1. Field of the Invention

The present invention relates to thermal heads used for image forming apparatus such as an ink-jet printer. The present invention also relates to image forming apparatus employing such a thermal head.

2. Description of the Prior Art

As is known, thermal heads have been used for thermal recording apparatus such as heat-sensitive type printers, heat transfer type printers and ink-jet type printers, etc.

Conventional thermal heads include a plurality of heating elements mounted on a ceramic substrate. The ceramic substrate is treated with a glass glazing process. The thermal head further includes integrated cricuits which drive individual heating elements. By using the thermal head described above, a thermal print recording apparatus forms an image on a sheet by heating elements which are energized in accordance with an image signal.

The thermal head uses the ceramic substrate which is usually ground to have a flat surface thereon. However, since the grinding process has a high processing cost, a high cost thermal head results. Generally, in this type of the head, precision processing techniques are needed when electrically connecting the integrated circuit and the heating elements, thereby further increasing production costs.

Furthermore, a sufficient space is required in the apparatus for a thin medium, such as an ink ribbon film to be arranged between a recording sheet and the head.

OBJECTS OF THE INVENTION

It is an object of the invention to provide an improved thermal head which may raise a packaging density by simple construction.

It is another object of the invention to provide an improved construction of a thermal head which may use the laser bonding process.

It is still another object of the invention to provide an improved thermal head which may be employed in an image forming apparatus, such as an ink-jet printer.

SUMMARY OF THE INVENTION

To attain the above objects, there is provided a thermal head comprising an aluminum supporting member and a rod-shaped member attached to one end of the supporting member. The rod-shaped member preferably is made of molybdenum. Heating elements are provided on the rodshaped member arranged in an axial direction of the rodshaped member. Lead electrodes including a common electrode and drive electrode along the circumferential direction of the surface of the rod-shaped member are provided for feeding power to each heating element.

A plurality of drive integrated circuits are mounted on the supporting member to energize each heating element through the lead electrodes in response to an image signal. Each connecting portion of the lead electrodes and drive integrated circuits is electrically connected with one connecting sheet on which electric wiring patterns are formed by a laser bonding process. The thermal head described above may be detachably mounted in an image forming apparatus such as, e.g., an ink-jet printer.

BRIEF DESCRIPTION OF THE DRAWINGS

The present invention is best understood with reference to the accompanying drawings in which:

FIG. 2(*b*) is a side view of the thermal head shown in FIG. 2(*a*);

FIG. 4(*b*) is a side view of the thermal head shown in FIG. 4(*a*);

DETAILED DESCRIPTION OF THE PREFERRED EXEMPLARY EMBODIMENT

An exemplary embodiment of the present invention will be now described in more detail with reference to the accompanying drawings.

Figure 1:
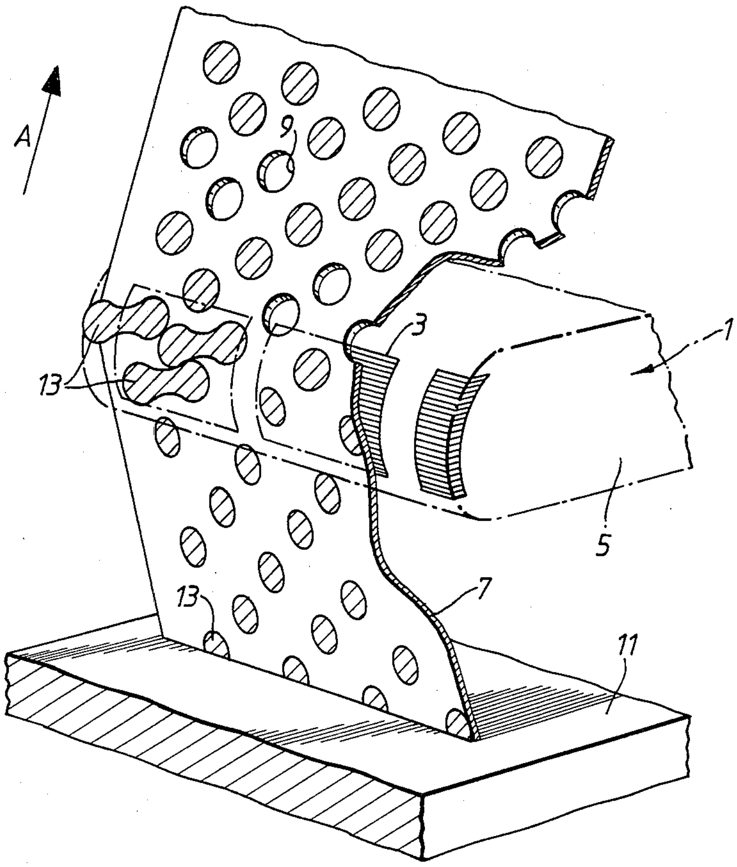
FIG. 1 is a perspective view for explaining an ink coating state in an ink-jet printer.

FIG. 1 is a perspective view for illustrating the printing principle of a thermal ink-jet printer using one example of the thermal head. A thermal head 1 includes a plurality of heating elements 3 arranged on a base member 5. Heating elements 3 are energized in accordance with an image forming signal from a data processing unit (not shown). Thermal head 1 is covered with an ink film 7 as a printing medium in the printing state. Ink film 7 is formed of a metal, organic material, or the like (e.g. a nickel sheet as a hydrophilic material), and a large number of holes 9 having a diameter of about 5 to 500 $\mu$m are formed therein. Ink film 7 is coated with polyethylene as hydrophobic material. Ink film 7 is held in an ink storage 11 filled with ink. When ink film 7 is moved in the direction indicated by arrow A, small holes 9 pass through ink storage 11 containing ink and are filled with ink 13. When small holes 9 filled with ink have reached thermal head 1 having heating elements 3, heating elements 3 are energized to be heated quickly. Then, ink droplets, corresponding to the holes opposite the energized heating elements, are ejected due to pressure from bubbles upon heating of heating elements 3, thus printing an image on a sheet (not shown).

The one embodiment of thermal head of the present invention will be described in more detail hereafter.

Figure 2A:
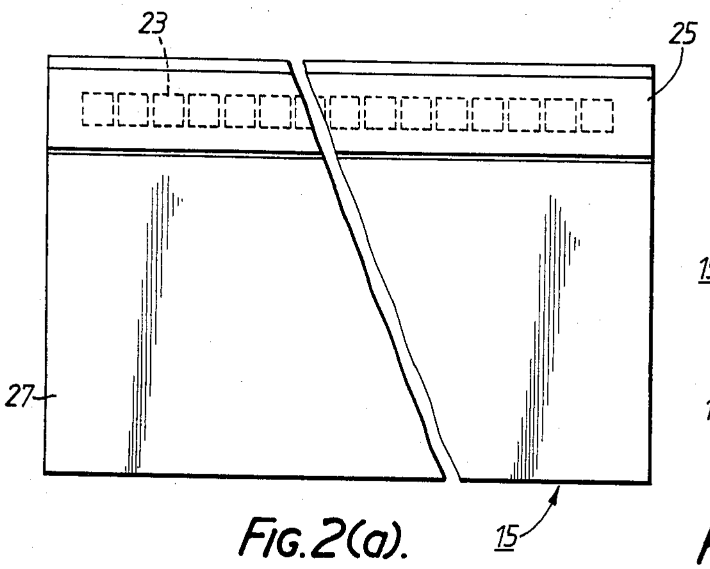
FIG. 2(*a*) is a plan view of a thermal head according to one embodiment of the present invention.
Figure 2B:
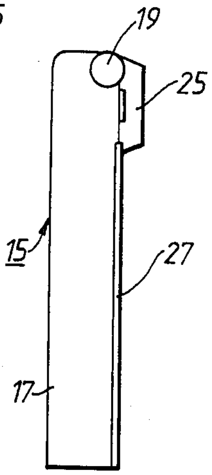
Figure 4B:
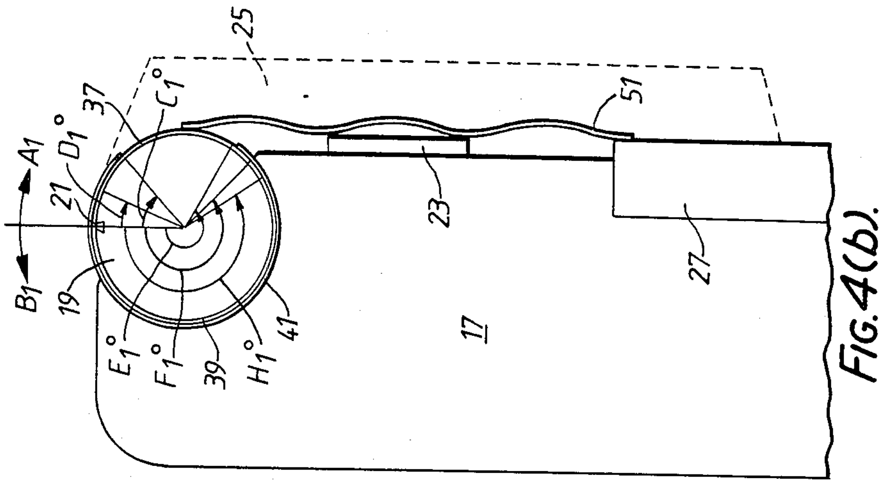
FIG. 4(*a*) is a partial plan view of the thermal head with sealing material removed.
Figure 4A:
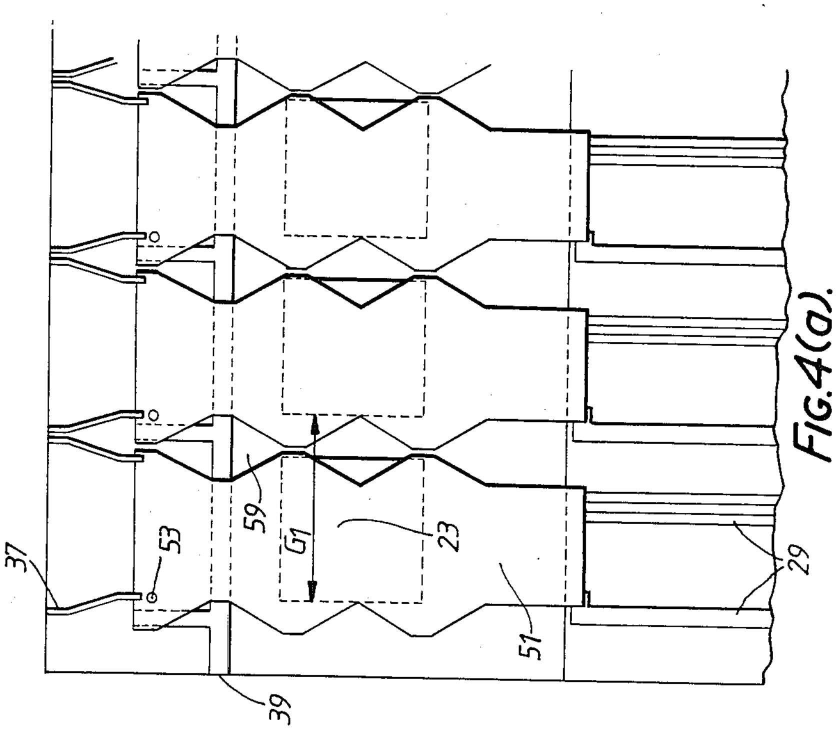

As shown in FIGS. 2(*a*) and 2(*b*), thermal head 15 comprises a plate-shaped aluminum base 17 and a rod-shaped member 19, in which heating elements 21, as shown in FIG. 4(*b*), are arranged, attached to one end of plate-shaped base 17. A plurality of integrated circuits 23 for respectively energizing heating elements 21 are provided along rod-shaped member 19 on base 17. Each output terminal of integrated circuits 23 is electrically connected to the corresponding heating element 21, as described later. A sealing material 25 covers rod-shaped member 19 and integrated circuits 23, except on heating elements 21 to protect these circuits and connecting portions between these elements from dust and moisture. A glass-epoxy resin plate 27 where electric wiring patterns (as shown in FIG. 4 (*a*)) are formed is provided on the surface of base 17.

Figure 3:
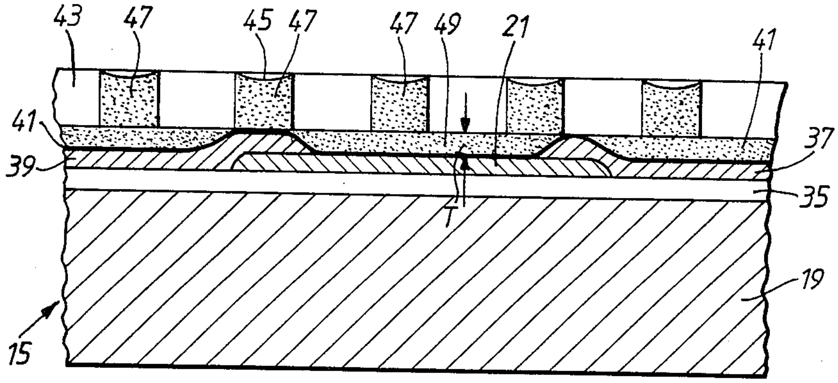
FIG. 3 is a partial sectional view illustrating an arrangement of an energizing element portion of the thermal head with regard to an ink film as shown in FIG. 1.

FIG. 3 is a sectional view of an essential part of thermal head 15 as shown in FIGS. 2(*a*) and 2(*b*).

A glazed glass layer 35 is formed on a molybdenum-rod (bar-shaped member) 19 to make an insulation later. Heating elements 21 and lead electrodes, i.e., drive electrodes 37 and common electrode 39 are arranged on glazed glass layer 35. Drive electrode 37 and common electrode 39 provide voltage to individual heating elements 21. A wear-resistant thin insulating layer 41 is formed on drive electrode 37, common electrode 39 and heating elements 21 to prevent electrodes 37 and 39 from being worn with ink film 43 and to prevent heating elements 21 from being oxidized.

When voltage is applied to heating elements 21, ink 45 in holes 47 is immediately ejected due to the pressure of the bubbles, as described above, thus achieving the printing operation. In this embodiment, the resistance of heating elements 21 is set at 300 Ω, and the 24-volt voltage of pulse width of 110$\mu$/sec is fed to elements 21 to eject ink. Thus, 2,100 ergs per heating element 21 is consumed.

When thickness T of gap 49 between heating element 21 and film 43 exceeds 3 $\mu$m, ink ejection power is substantially uniform, and good printing quality can be obtained. However, if thickness T exceeds 10 $\mu$m, ejection power is reduced and printing quality is degraded. When thickness T is below 3 $\mu$m, energy consumption per heating element 21 exceeds 2,100 ergs, and the smaller thickness T, the more energy is required. In this embodiment, thickness T is set to 3 $\mu$m.

In view of endurance ability of heating elements 21, as a material for heating elements 21, a metallic oxide thin film, which contains ruthenium oxide as a major component and 0.6 to 2.0% (atomic ratio : M/Ru[ruthenium]) of M (M is at lease one element selected from the group consisting of Ca [calcium], Sr [strontium], Ba [barium], Pb [lead], Bi [bismuth], and Te [thallium] is used.

When the metallic oxide thin film is used, a change in resistance of heating elements 21 due to oxidation can be prevented. Therefore, high electric power can be applied to heating elements 21 to cause them to achieve high temperatures regardless of the change in resistance, and stability over a long-term use can be assured. Since the metallic oxide thin film used for heating elements 21 has a relatively high resistance, only a small current is required to achieve a high heating density. For this reason, current flowing through a conductive layer, e.g., lead electrodes, connected to heating elements 21 is reduced, and heat generation from this portion can be suppressed. Therefore, so-called image blurring during the printing operation can be prevented. In addition, since the thin film has a positive resistance-temperature coefficient, a large current can be applied thereto from the beginning to achieve high-speed printing.

The structure of thermal head 15 will now be described with reference to FIGS. 4(*a*) and 4(*b*). As can be seen in FIG. 4(*b*), a molybdenum 19 is mounted on a corner of base 17. As described above, integrated circuits 23 and glass-epoxy resin plate 27 are also provided on the surface of base 17. Individual drive electrode 37 for feeding voltage to corresponding heating element 21, as shown in FIG. 3, is formed on the surface of rod 19 along the circumferential direction ($A_1$) of rod 19. Each terminal of drive electrodes 37 is electrically connected to a corresponding terminal of integrated circuit 23 with a polyimide film 51 on which electric wiring patterns are formed. Common electrode 39 also is formed on the surface of rod 19 along the opposite direction ($B_1$) against drive electrode 37, and is electrically connected to a corresponding terminal of integrated circuit 23 with polyimide film 51.

As can be seen in FIGS. 4(*a*) and 4(*b*), heating elements 21 are arranged at the position of rod 19 perpendicular to the upper surface of base 17, and terminals (connecting points) of drive electrode 37 and common electrode 39 are located at a 90° angle from heating elements 21. Since, in general, it is desirable that connecting points be in the same plane with one another for soldering or bonding with one another, other connecting points, such as the terminals of integrated circuit 23, are located on a tangent line of rod 19 in this embodiment. If the terminals of drive electrode 37 and common electrode 39 are not located at the above-described position, the terminals of integrated circuit 23 are slantingly mounted against base 17 to make these terminals of integrated circuit 23 locate in the same plane as terminals of drive electrode 37 and common electrode 39. Therefore, an additional process to base 17 is required. In view of packaging efficiency, it is desirable that terminals (connecting points) of drive electrode 37 and common electrode 39 be located at a 90° angle from heating elements 21.

The coating range of wear-resistant thin insulating layer 41 in the $A_1$ direction extends from heating elements 21 to the angle $C_1°$, which is greater than that ($D_1°$) of the connecting point between sealing material 25 and drive electrodes 37 ($D_1° < C_1°$). The coating range of thin insulating layer 41 in the $B_1$ direction extends from heating elements 21 to the angle $E_1°$, which is greater than that ($F_1°$) of the connecting point between base 17 and common electrode 39 ($F_1° < E_1°$).

Almost all of common electrode 39 is a plane pattern, but in the vicinity of the connecting point it is concave or convex shaped (not shown). This shaping prevents diffusion of the solder when soldering, and these concave or convex shape is arranged to be the same as, or an integer multiple of, the interval $G_1$ of integrated circuit 23. The angle $H_1°$ to the concave notch is smaller than the angle $E_1°$ of wear-resistant thin insulating layer 41 ($H_1° < E_1°$), and this prevents diffusion of the solder in the circumferential direction.

As shown in FIG. 4(*a*), markers 53 on polyimide film 51 are spaced at every interval $G_1$ of integrated circuit 23, and are used for detecting the positions of drive electrodes 37 during the connection process. If the distances and directions from markers 53 are recorded beforehand, it is possible to calculate accurate connecting positions from the locations of at least two markers 53.

Figure 5:
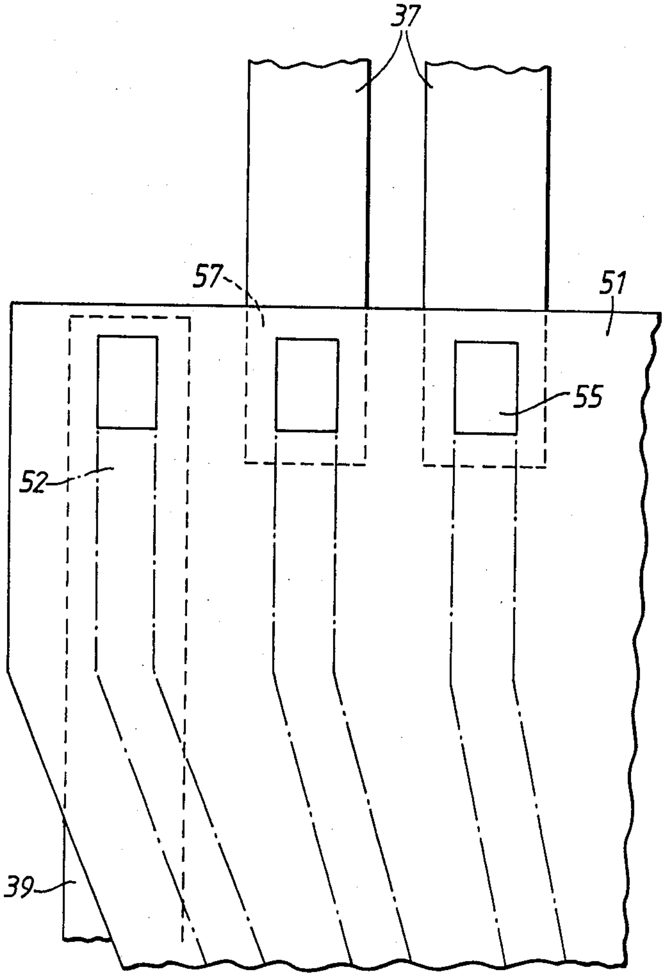
FIG. 5 is an enlarged partial plan view of the connecting portion of lead electrodes and electric wiring patterns formed on the film.

In this embodiment, the film-carrier method is employed, instead of the conventional wire-bonding method. As can be seen in FIG. 4(*a*), the film-carrier method uses a polyimide film 51 on which electric wiring patterns 52 are formed with copper and tin coatings 55 provided on only the connecting points (as shown in FIG. 5). The size of coating 55 is slightly smaller than that of the point 57 of drive electrode 37 to be connected. This makes it possible to have a large degree of error in the alignment of film 51. In this embodiment, laser bonding may be used for making the connections. This eliminates the poor bonding due to non-uniformity of heat which results from conventional heatbonding with an electric soldering iron. In addition, the simultanious bonding of every bit of drive electrodes 37 can be carried out at one time in a single operation by using the film-carrier method.

In thermal head 15 of this embodiment, since drive electrode 37 and common electrode 39 are formed on molybdenum rod 19, it is possible to align the terminals of the two electrodes 37 and 39 on a straight line along the axial direction of rod 19. Therefore, the terminals of the two electrodes 37 and 39 can be bonded at the same time in a single operation.

Figure 6:
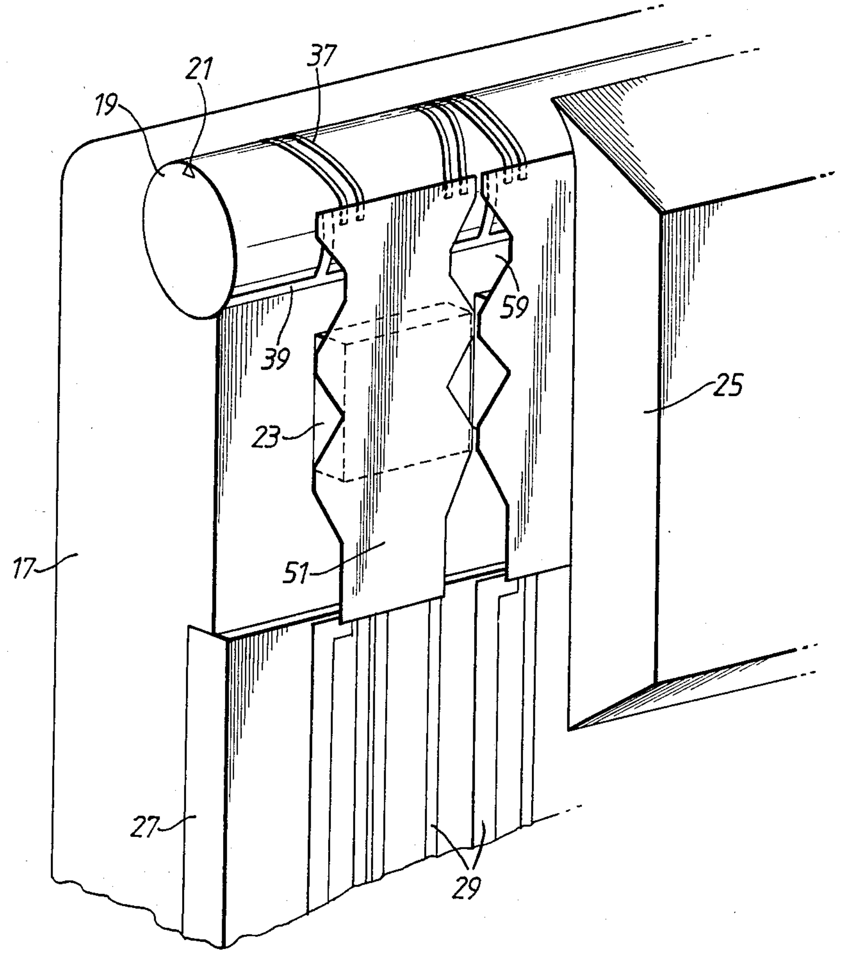
FIG. 6 is a partial perspective view of the thermal head with the sealing material removed.

Polyimide film 51 has a plurality of constructed portions 59 (as shown in FIG. 4 (*a*)) at its opposite sides, except at the bonding points. Constricted portions 59 of polyimide film 51 allow sealing material 25 to enter easily into the reverse side of polyimide film 51. As shown in FIG. 6, aluminum base 17 is processed so that the terminals of drive electrode 37 and common electrode 39, the pad (terminals) of integrated circuit 23 and the terminals of electric wiring patterns 29 on glass-epoxy resin plate 27 are all on the same plane. Thus the joining of the terminals can be performed in one bonding operation by laser bonding. Therefore, it is possible to carry out a bonding operation which previously has required two films in a single operation with one film.

Figure 7:
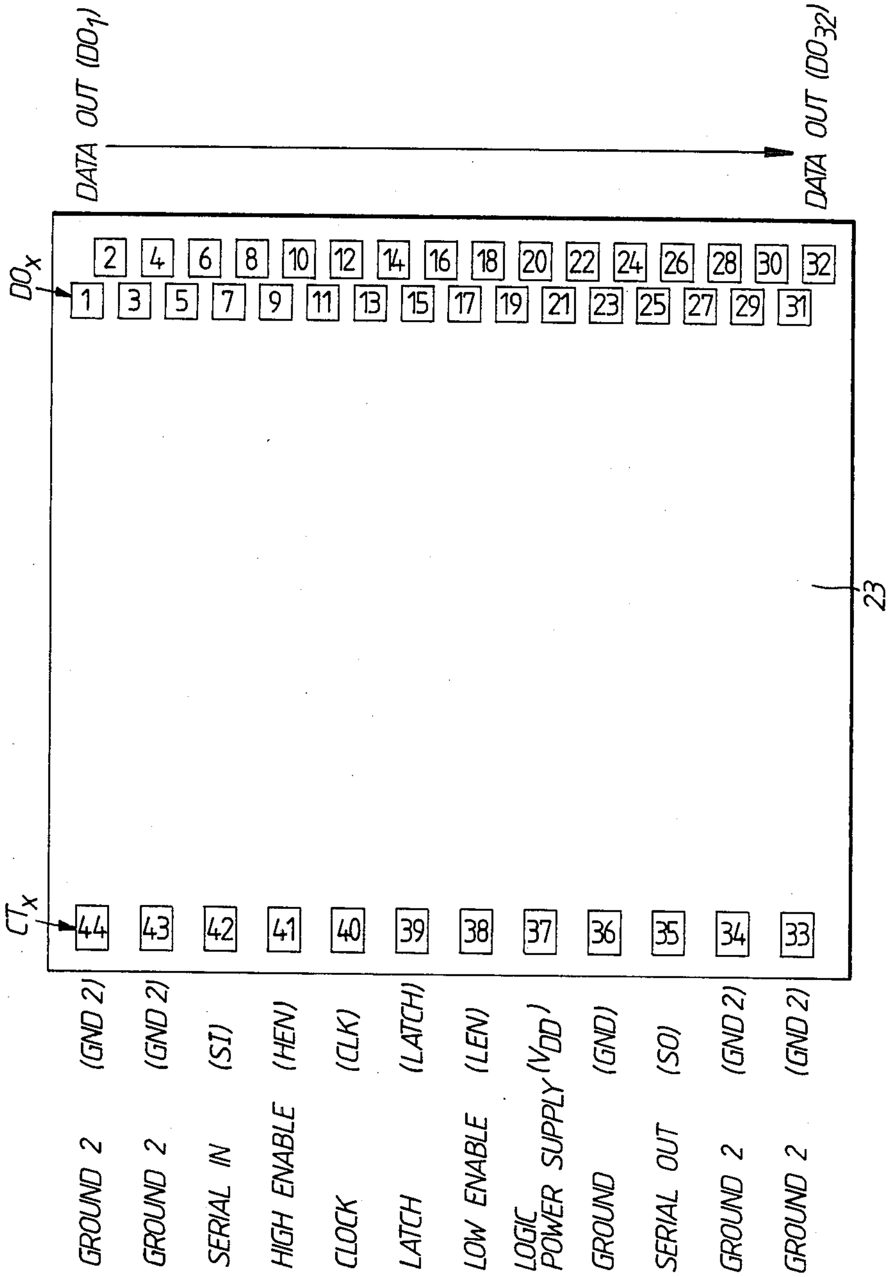
FIG. 7 is a plan view of a pad layout of an integrated circuit.
Figure 8:
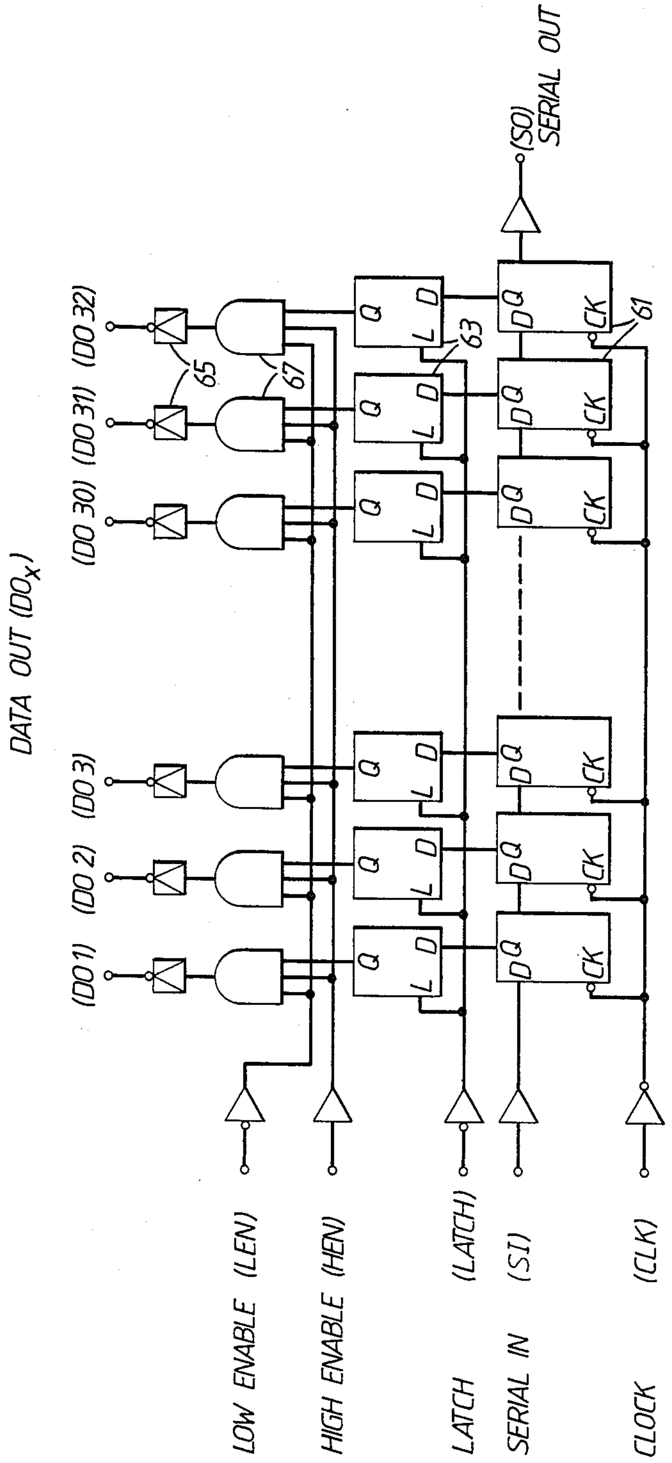
FIG. 8 is a logic circuit of the integrated circuit shown in FIG. 7.

FIG. 7 shows a pad layout of drive integrated circuit 23, and FIG. 8 shows a circuit diagram of drive integrated circuit 23. As shown in FIG. 7, parallel output terminals $DO_x$ ($x = 1, 2, 3, \ldots, 32$) of integrated circuit 23 are arranged at one side, and the control terminals $CT_x$ ($x = 1, 2, \ldots, 33$) at the other side of the pad. In FIG. 8, the SI signal sequentially shifts from data input D of left-most D-F/F (data type flip-flop) 61 to data input D of right-most D-F/F 61 in synchronism with the CLK signal (clock signal), and the data is latched to a designated latch circuit 63 when a latch signal is generated. When the LEN (low-enable) signal is "L (low)" and HEN (high-enable) signal is "H (high)", an output signal from the designated latch circuit 63 is fed to a corresponding drive circuit 65 through a corresponding AND circuit 67. As a result, a corresponding heating element 21 is energized by the corresponding drive circuit 65.

Figure 9:
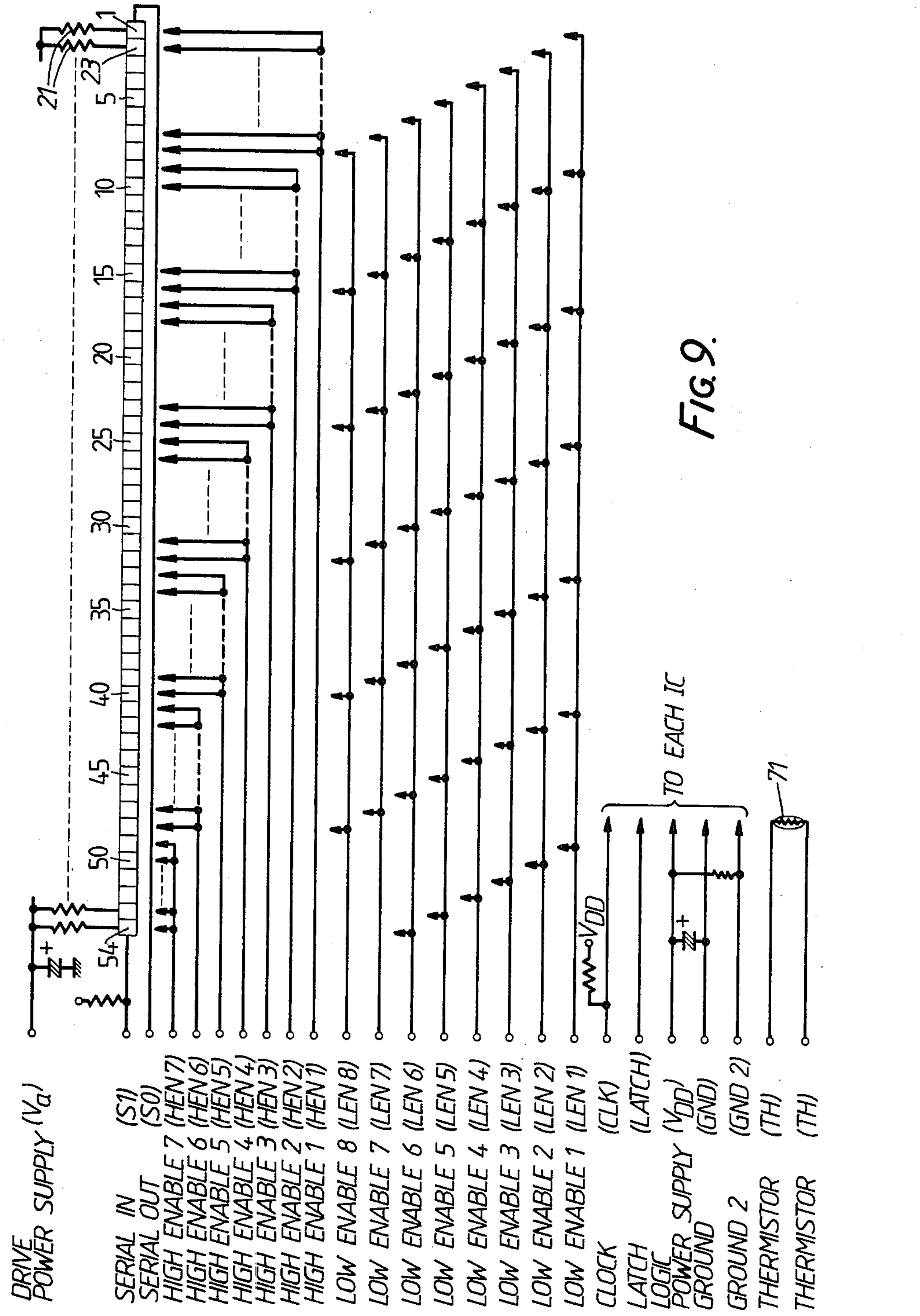
FIG. 9 is a circuit diagram of the thermal head.
Figure 11:
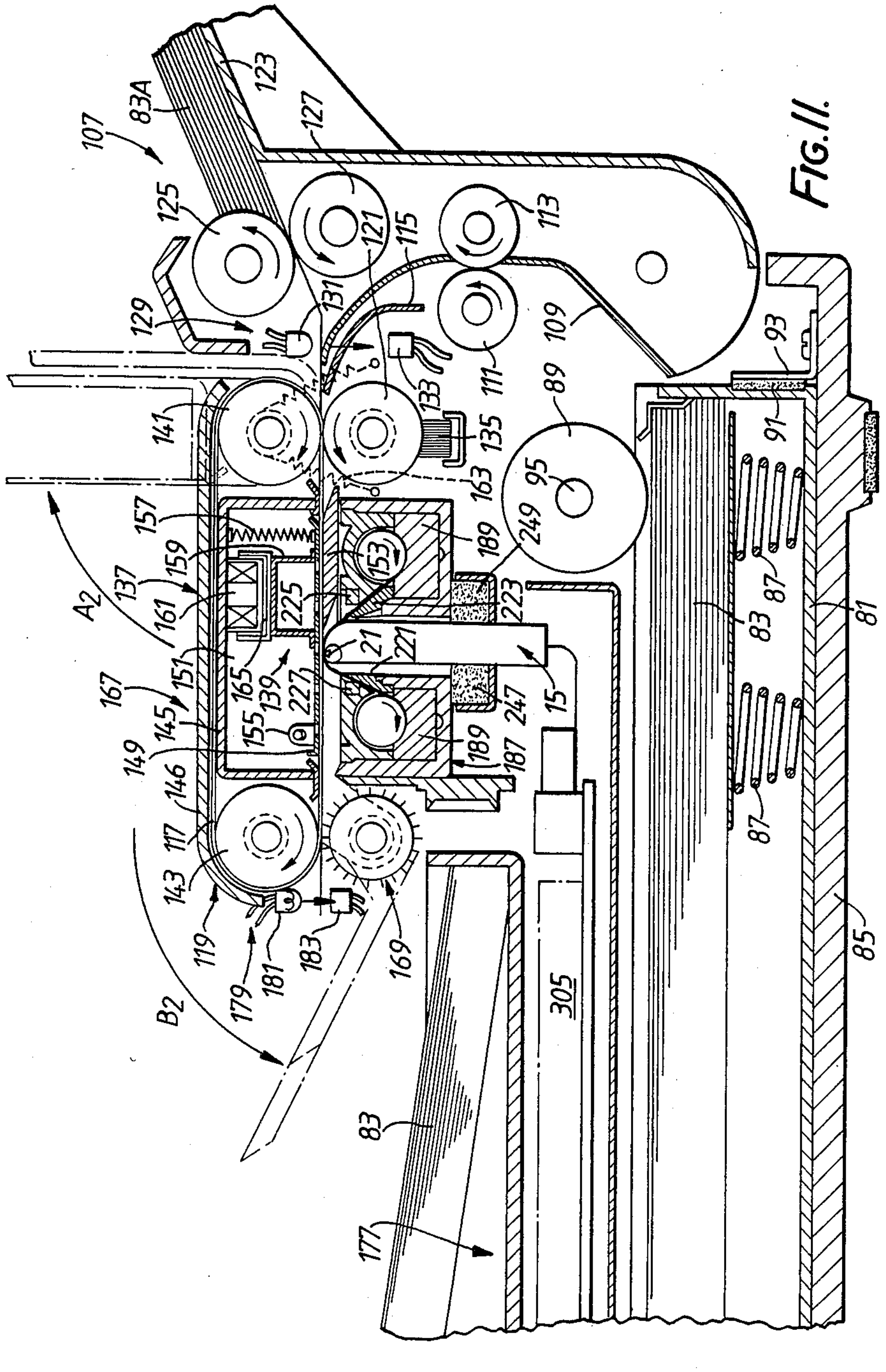
FIG. 11 is a schematic longitudinal sectional view of a printer according to an embodiment of the present invention.

FIG. 9 shows a circuit diagram of thermal head 15. As can be seen in FIG. 9, fifty four integrated circuits 23 are employed, and these circuits receive signals from control circuit 305, as shown in FIG. 11. Each integrated circuit 23 has thirty two data-out terminals each connected to an individual heating element 21. A serial-in signal terminal (SI) is serially connected from terminal (D) of flip-flop circuit 61 (as shown in FIG. 8) of left-most integrated circuit 23 to the data terminal (D) of flip-flop circuit 61 of right-most integrated circuit 23. A serial-out signal terminal (SO) is connected to the right-most integrated circuit 23. A first high-enable signal terminal (HEN1) is connected in parallel to input terminals from the first integrated circuit (right-most integrated circuit) to the 8th integrated circuit as shown in FIG. 9. A second high-enable signal terminal (HEN2) also is connected in parallel to input terminals from the 9th integrated circuit to the 16th integrated circuit. The other high-enable signal terminals (HEN3, HEN4, HEN5 and HEN6) also are connected to the terminals of the corresponding integrated circuits 23 in the same manner as HEN1 and HEN2. A 7th high-enable signal terminal (HEN7) is connected in parallel to input terminals from the 49th integrated circuit to the 54th integrated circuit (left-most integrated circuit). Low-enable signal terminals (LEN1, LEN2, LEN3, LEN4, LEN5, LEN6, LEN7 and LEN8) are connected to integrated circuits 23. That is, first low-enable signal terminal (LEN1) is connected to first integrated circuit (right-most integrated circuit), and second low-enable signal terminal (LEN2) is connected to second integrated circuit. Also, 8th low-enable signal terminal (LEN8) is connected to 8th integrated circuit. Furthermore, the first low-enable signal terminal (LEN1) is connected to the 9th integrated circuit, and the second low-enable signal terminal (LEN2) is connected to the 10th integrated circuit. Similarly, the low-enable signal terminals are cyclically connected to individual integrated circuits 23, as described above. Clock signal terminal (CLK) and latch signal terminal (LATCH) are individually connected to integrated circuits 23.

The voltage of a logic power supply (VDD) is fed to each integrated circuit 23. A ground terminal (GND) is used for grounding an input logic line (not shown) of each integrated circuit 23. A second ground terminal (GND2) is used for grounding a driver output line (not shown) of each integrated circuit 23. A thermistor 71 detects the temperature of thermal head 15 and feeds its output signal through thermistor terminals (TH) to control circuit 305, as shown in FIG. 11.

Since thermal head 15 of this embodiment includes molybdenum rod 19, aluminum base 17 and glass-epoxy resin plate 27, the cost thereof is less than 1/10 of that of a conventional ceramic substrate.

When estimated from calculation of the energy consumption distribution, most of the energy (90% or more) which is consumed by heating elements 21 with pulse heating is stored in molybdenum rod 19 and film 43, and the remaining energy is consumed by heating elements 21. This stored energy heats film 43 and ink 45, and the temperature of ink 45 rises almost to its boiling point. Because of this, the ink ejecting condition will vary depending on whether there is heat storage or not. This heating history can cause non-uniformity of ink density in the printed image.

To solve the above-described problem, a rod substrate, which is made of a metal having a good thermal conductive coefficient, was used. However, an insulation film, such as e.g., a glazed glass layer on which electrodes 37 and 39 and heating elements 21 are formed, must be provided for the metal rod. If the thermal expansion coefficients of the metal rod and the insulation film differ greatly from one another, the insulation film of glazed glass may crack when the heating elements 21 are heated. In this embodiment, molybdenum is used for the metal rod, as described above. For instance, since the thermal expansion coefficient of aluminum (Al) is $23\times10^{-6}$/C.°, and is 4 times greater than that of a glazed glass insulation film ($6\times10^{-6}$), aluminum is unsuitable for the metal rod substrate.

Molybdenum has a good adhesive property with glass, and its heat expansion coefficient is $5\times10^{-6}$/C.°, which is almost equal to that of glass. Furthermore, since its thermal conductivity coefficient of 0.35 cal/cm/s/C.° is two times that of glass, no heat accumulation occurs in rod substrate 19.

Figure 10:
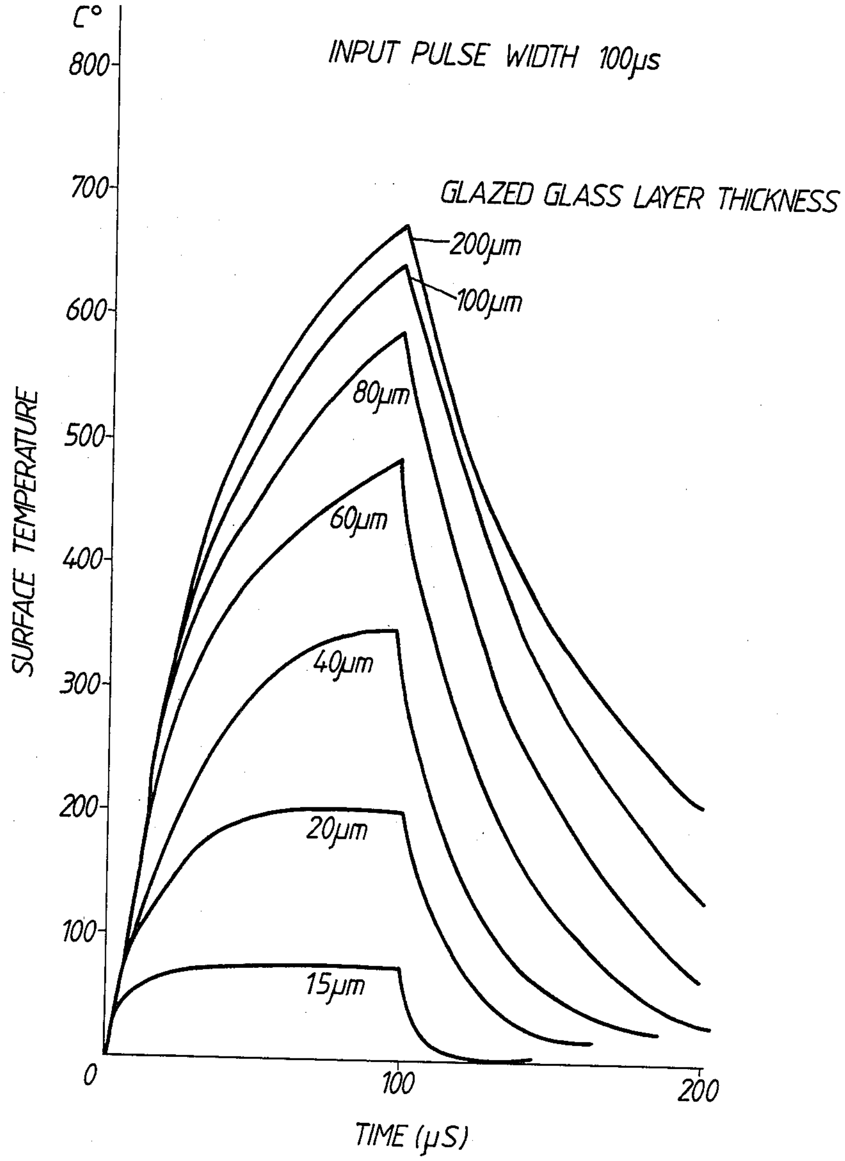
FIG. 10 is a graph illustrating the temperature changes on the surface of a heating element when the thickness of a glazed glass layer formed on the heating element is changed.

As shown in FIG. 10, a simulation of the surface temperature of heating element 21 was carried out in order to observe the effect of the thickness of the glazed glass layer. It can be understood that, although a thicker glazed glass layer was better for improving the thermal efficiency, increasing the thickness of the glazed glass layer above 100 μm did not improve efficiency. To the contrary, a thicker layer caused the temperature fall of glazed glass layer to be delayed. Therefore, the range of 20 μm–100 μm is considered desirable for the thickness of the glazed glass layer. In this embodiment, a 60 μm glazed glass layer was formed on molybdenum rod 19. Furthermore, in this embodiment, since base 17 is made of aluminum plate, the heat energy generated at heating elements 21 and stored in molybdenum rod 19 may be rapidly transmitted to and diffused from the aluminum plate (base 17). Therefore, the printed image quality is greatly improved.

Also, since molybdenum rod 19 with heating elements 21 arranged thereon is mounted on the top portion of thermal head 15, the recording sheet can be quickly and easily separated from heating elements 21 immediately after recording, in comparison with the conventional thermal head where heating elements are arranged at the top portion (flat portion) of a substrate.

Figure 12:
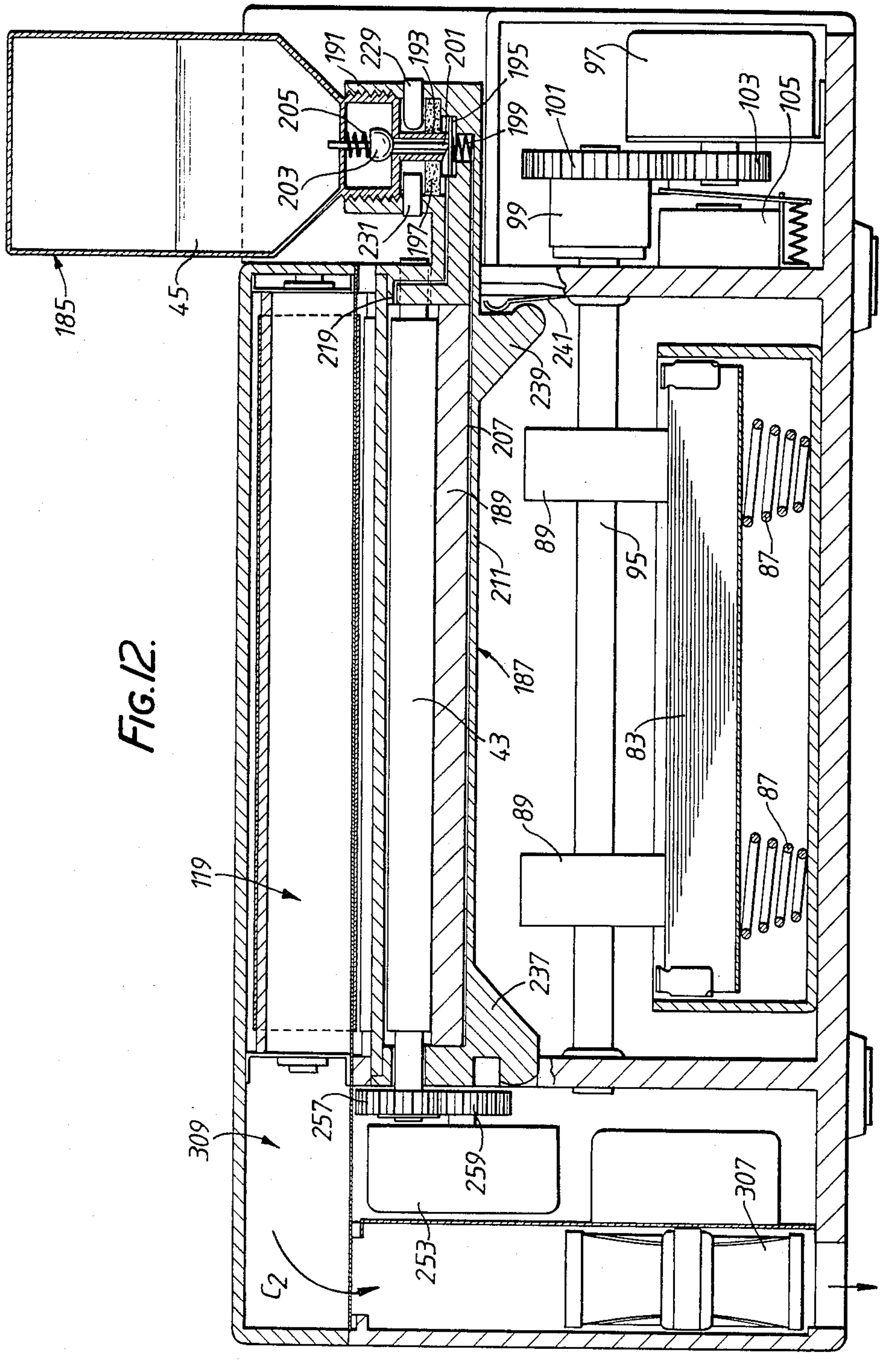
FIG. 12 is a schematic cross-sectional view of the printer shown in FIG. 11.

FIGS. 11 and 12 show an ink-jet printer using the above-described thermal head 15. A paper feed cassette 81 for storing recording sheets 83 is loaded in the lower portion of a housing 85. A lower plate of cassette 81 at the paper pick-up side is pushed upward by the biasing force of a pair of push-up springs 87, and upper-most recording sheet 83 is always in contact with first feed rollers 89. When cassette 81 is loaded in housing 85, a rubber magnet 91 mounted on cassette 81 magnetically attracts a metal plate 93 mounted on housing 85 to fix the cassette 81 to housing 85.

A shaft 95 axially supports first feed rollers 89 and is coupled to a paper feed motor 97 through a spring clutch 99 and gears 101 and 103, as shown in FIG. 12. Spring clutch 99 is engaged/disengaged by a solenoid 105. When solenoid 105 is energized in response to a recording signal from an image or data processing apparatus (not shown) connected to printer 107, clutch 99 engages shaft 95 with gear 101. Therefore, rotating power from motor 97 is transmitted to shaft 95 through gears 101 and 103 and clutch 99, and upper-most recording sheet 83 is conveyed by first feed rollers 89.

Recording sheet 83 picked up from cassette 81 through rollers 89 is guided upward along a first paper feed guide 109, and then clamped and conveyed by a pair of feed rollers 111 and 113. Rollers 111 and 113 are arranged in a paper feed direction and in rolling contact with each other. Thus, sheet 83 is fed between first and second paper feed guides 109 and 115. Sheet 83 is fed until its front edge abuts against an attraction conveyor belt 117 of a paper convey unit 119 (to be described later) and a register roller 121, which is in rolling contact therewith and is stopped, thus standing by at this position.

Printer 107 is provided with a manual paper feed table 123 for manually feeding sheets in addition to those in cassette 81. When manual recording sheets 83A (e.g., thick sheets) are set on table 123, they are picked up one by one starting with the lower-most sheet by means of a second feed roller 125 and a separation roller 127. The sheets 83A are fed until the front edge thereof abuts against belt 117 and roller 121 in the same manner as in the paper feed operation from cassette 81. In this state, sheet 83A stands by.

Roller 121 is coupled to motor 97 through a clutch (not shown), and is rotated upon engagement of the clutch. A paper detector 129 for detecting the presence/absence of paper is provided between register roller 121 and second feed roller 125. Detector 129 comprises a first light-emitting diode (LED) 131 and first photosensor 133 for receiving light emitted from LED 131. When the front edge of sheet 83 shuts off the light from LED 131, it abuts against the rolling contact portion of roller 121 and belt 117 a given time (e.g., 2 to 3 sec) after photosensor 133 is turned off. Thus, sheet 83 is appropriately bent.

In this bending of the sheet, the inclination of the front edge of sheet 83 (skew) can be corrected, and the front edge is accurately fed into the rolling contact portion of roller 121. Therefore, sheet 83 can be satisfactorily clamped between roller 121 and belt 117.

It should be noted that a dust removing brush 135 for removing paper dust attached to the circumferential surface of roller 121 is in sliding contact with the lower surface of roller 121, thus preventing the recording surface of sheet 83 from being contaminated.

Paper convey unit 119 comprises first and second floating sections 137 and 139. First floating section 137 incorporates first and second rollers 141 and 143, belt 117 looped between rollers 141 and 143, and an air suction duct 145 in a cover 147. Second floating section 139 comprises a belt guide plate 149 and a belt urging/separating mechanism 151. The mechanism 151 urges belt 117 against or separates it from a guide 153 which guides sheet 83 to thermal head 15, as shown in FIGS. 11 and 12.

In mechanism 151, belt guide plate 149 is pivotally supported at one end by a hinge 155 in duct 145, and the other end thereof is biased downward by a spring 157, thus urging belt 117 against guide 153. An attraction member 159 is mounted on the back surface of guide plate 149 to face an electromagnetic coil 161. When coil 161 is energized, guide plate 149 is shifted against the biasing force of spring 157.

First floating section 137 is biased against roller 121 by a spring 163 looped around roller 141. The spring 163 has two ends fixed to housing 85, and guide plate 149 of second floating section 139 is elastically suspended by spring 157. Therefore, even is supplied sheet 83A is thick, floating sections 137 and 139 can be shifted accordingly.

A high-viscosity fluid shock-absorber 165 is mounted on plate 149 of second floating section 139 to absorb shocks applied to plate 149.

Paper convey unit 119 is pivotally supported coaxially with the shaft of first roller 141, and can pivot in the direction indicated by arrow $A_2$ to open a paper convey path. Therefore, if a paper jam occurs midway along the convey path, the jammed paper or the cause of the jam can be eliminated easily.

When roller 121 begins to rotate, the front edge of sheet 83 is clamped between roller 121 and belt 117 of first floating section 137 at an appropriate pressure by the biasing force of spring 163. Then, sheet 83 is conveyed by the clamping and conveying force of rollers 121 and 141 and the attraction and conveying force of belt 117.

In this case, sheet 83 is urged against guide 153 by mechanism 151, and is guided to a print unit 167 to be slid along guide 153.

Guide 153, described above, is fixed with reference to thermal head 15, so that the surface of guide 153 is separated from heating elements 21 of head 15. In this case, the recording surface (lower surface) of sheet 83 is separated by a small gap (e.g., 0.2 mm) from the surface of film 43 which moves to contact heating elements 21 of thermal head 15. In this embodiment, the gap between the surfaces of film 43 and sheet 83 is kept within the range of about 0.1 to 0.3 mm when a resolution of 8 lines/mm is to be maintained. It may appear that the recording surface of sheet 83 might be in contact with ink 45 filled in holes 47 of film 43 due to the small gap between film 43 and sheet 83. In this case, however, since the surface of guide 153 has a hydrophobic character, and the edge portion thereof adjacent to heating elements 21 (thermal head 15) is formed in a knife-edge shape, the ink on the surface of film 43 is drawn into the under surface of guide 153 along the moving direction of film 43, thus preventing the ink from expanding or percolating to the recording surface side of film 43.

In this embodiment, film 43 is formed of a polyimide film with a thickness of 12.5 μm. This film 43 is treated by a photo-etching process and a large number of holes having a diameter of about 25 μm to 30 μm are formed therein. The surface of ink film 43 facing sheet 83 is coated with a hydrophobic material such as polytetrafluoroethylene. Furthermore, since the surface of ink film 43 facing sheet 83 and the surface of thermal head 15 are coated with a siloxane derivative of about 3 μm thickness as an abrasion resistance material, abrasions and scratches of ink film 43, which moves in contact with the surface of thermal head 15 during printing, are prevented.

The siloxane derivative is manufactured by obtaining a colloidal dispersion of partially hydrolyzed material, after reacting four functional silicon tetra chloride with water in a solution of a prescribed amount of monohydric alcohol and ester.

The siloxane treatment forms a membrane of silica on the surface of ink film 43. Since the membrane of silica has heat-resistant, hygroscopic and hydrophilic properties, the ink uniformly adheres to the surface of film 43 (the membrane of silica) and is rapidly fed to heating elements 21 by capillary action through the contacting surface between thermal head 15 and film 43.

Figure 13:
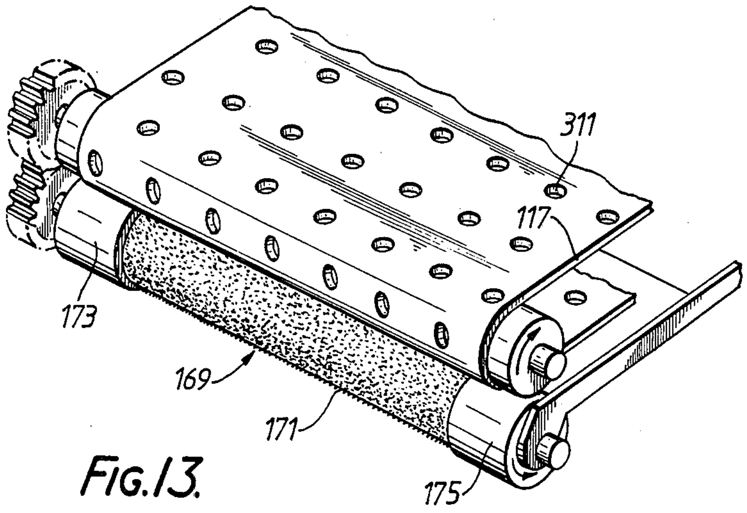
FIG. 13 is a partial perspective view of a paper discharge unit.

After printing, when the front edge of sheet 83 further moves forward, it is clamped between second roller 143 of first floating section 137 and a paper discharge roller 169. In this embodiment, as shown in FIG. 13, the recording surface of sheet 83 is supported by needle-shaped portion 171 having needles projecting from the circumferential surface of roller 169. Reference roller portions 173 and 175 are provided at both end portions of roller 169 and are in rolling contact with belt 117. Therefore, sheet 83 can be conveyed without receiving excessive pressure, thus protecting the undried image from deterioration. More sepcifically, since the ink ejected on sheet 83 is not rubbed by rollers surface, a clear image can be obtained.

Sheet 83 moves forward further, and the rear edge thereof passes through the rolling contact portion between register roller 121 and first roller 141.

In this case, a force for urging sheet 83 against guide 153 is transmitted through mechanism 151, and belt guide plate 149 of second floating section 139 is pushed upward relative to the housing of first floating section 137 by a reaction force to plate 149 from guide 153 against the biasing force of spring 157 through shock-absorber 165.

After the rear edge of sheet 83 has passed between rollers 121 and 141, roller 121 and belt 117, which are temporarily separated, are again brought into rolling contact with each other by their weights. Therefore, the pressure applied on sheet 83 is reduced to the total weight of plate 149 and the biasing force of spring 157, and sheet 83 can be smoothly conveyed.

If the rear edge of sheet 83 receives the total weight of paper convey unit 119, sheet 83 must be conveyed while receiving a large frictional force, resulting in unstable conveyance.

When sheet 83 moves further forward and the rear edge thereof has passed by the edge portion of guide 153 at the side of thermal head 15, guide plate 149 has already been pushed upward through shock-absorber 165, and can be moved downward slowly by the shock-absorbing effect of shock-absorber 165. Therefore, the rear edge of sheet 83 can pass by heating elements 21 of thermal head 15 while sheet 83 is approaching the surface of film 43. If belt guide plate 149 does not receive any reaction force and is moved downward by the combination of its total weight and the biasing force of spring 157, the surface of film 43 is brought into contact with the recording surface of sheet 83 immediately after the rear edge of sheet 83 passes through the edge portion of guide 153, thus contaminating the rear edge of sheet 83 with ink.

In this embodiment, when the front or rear edge of sheet 83 falls within the range of about 6 mm from heating elements 21 forward and backward along the paper convey direction, electromagnetic coil 161 is energized to attract guide plate 149 upward. Then, sheet 83 separates from the surface of film 43, thus preventing the front or rear edge of sheet 83 from contacting the surface of film 43 even if the front or rear edge of sheet 83 is folded or bent.

In this way, contact and contamination of sheet 83 by film 43 is eliminated. Sheet 83 passes by roller 169 while a small gap is maintained between belt 117 and film 43, and sheet 83 is discharged onto a paper discharge tray 177 without being contaminated.

A detector 179 for detecting whether sheet 83 has been discharged is provided between rollers 169 and 143 at the side of tray 177. Detector 179 includes a second LED 181 and a second photosensor 183 facing the paper convey path. When sheet 83 is discharged to tray 177 and the rear edge thereof passes by LED 181, an ON-signal of photosensor 183 is generated to signal the completion of the sheet discharging operation.

The ink supply from an ink tank 185 to a film cartridge 187 and from an ink storage 189 of cartridge 187 to ink film 43 will be described with reference to FIGS. 11 and 12.

As shown in FIG. 12, film cartridge 187 and ink tank 185 are detachably mounted, as described later. Ink 45 is stored in tank 185, which is screwed in and fixed to an ink-tank mounting portion 191 of cartridge 187. A transparent ink supply tube 193 of tank 185 pushes a valve 195 of cartridge 187 into tight contact with a seal 197 for sealing mounting portion 191 against the biasing force of spring 199. Valve 195 of cartridge 187 pushes an ink-tank open/close rod 201 upward and, therefore, pushes a valve 203 of tank 185 against the biasing force of a valve spring 205, thus supplying ink 45 from tank 185. Ink 45 is supplied from tank 185 until the obliquely cut distal end portion of tube 193 is filled with ink 45. Ink 45 is caused to flow into narrow ink supply paths 207 and 209 formed in a container portion 211 of cartridge 187 through small holes formed in the surrounding portion of valve 195 of cartridge 187 and a guide path 213, as shown in FIG. 17.

Ink 45 soaks into felt ink supply members 215 and 217 (shown in FIG. 17), and is coated on film 43 therethrough. Therefore, as shown in FIG. 1, small holes 47 of film 43 are filled with ink 45, and ink droplets are formed by bubbles upon rapid heating by heating elements 21.

In mounting portion 191, when ink 45 is consumed and the level of ink 45 drops below the obliquely cut distal end of tube 193, air is taken from an air suction path 219 formed in ink storage 189 of cartridge 187 into ink tank 185, thus feeding new ink 45. As can be seen in FIGS. 11 and 12, air suction path 219 is formed in the upper portion of mounting portion 191, so that its volume is set as small as possible. As will be described later, air communication with respect to ink storage 189 is allowed only when small holes 47 of film 43 pass by elastic rubber excessive ink removing members 221, 223, 225 and 227, shown in FIGS. 11 and 17, which also act as seal members. Thus, ink 45 can be refilled from tank 185 to ink storage 189 when film 43 is moved, but this operation is not allowed when cartridge 187 is exchanged or removed. Thus, ink 45 will not be excessively fed to cartridge 187, and leakage thereof is prevented.

Figure 17:
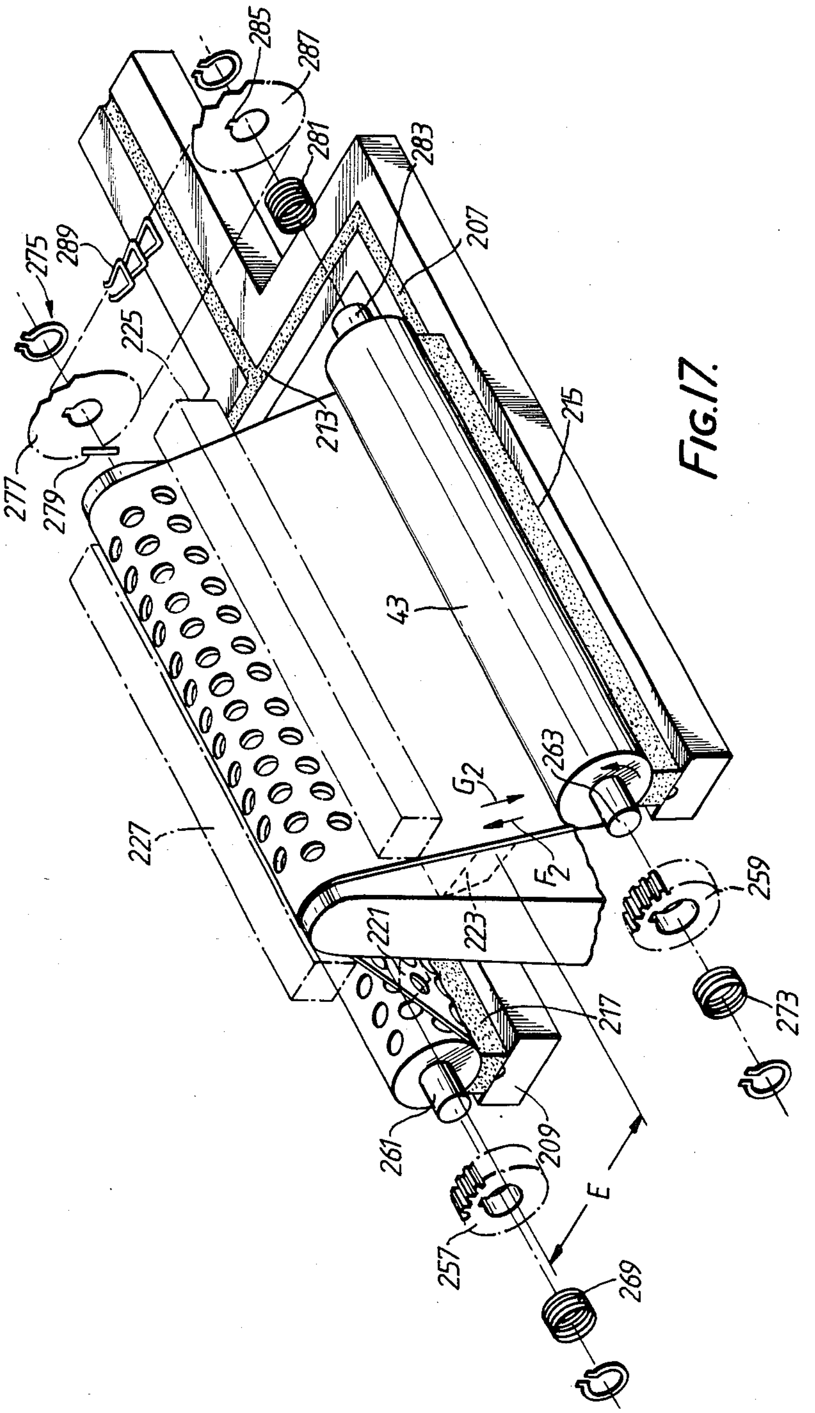
FIG. 17 is a perspective view of a print unit.

As shown in FIG. 17, since ink 45 is supplied to film 43 through felt ink supply members 215 and 217, it will not form a free surface as liquid in ink storage 189. Since ink 45 is trapped in the felt fibers by its surface tension, it cannot leak outside cartridge 187.

The operation when tank 185 is demounted from mounting portion 191 of cartridge 187 will be described below.

When ink 45 in tank 185 is used up upon refilling thereof, the level of ink 45 drops further and reaches tube 193. At this time, light emitted from an ink detection LED 229 is transmitted through tube 193 to turn on an opposing ink detection photosensor 231, thus producing a detection signal. Thereby, a no-ink stage of ink tank 185 can be detected.

Then, printer 107 displays the no-ink state on a display portion thereof or on a display portion of the data processing apparatus (not shown) connected thereto. When ink 45 is not supplied to head 15, the no-ink state of tank 185 (i.e., a need for replacement ink) is signaled. Ink tank 185 is then replaced. In this case, a demounting procedure and the operation of valve 203 of tank 185 and valve 195 of cartridge 187 are performed in a manner opposite to the mounting operation. More specifically, valve 195 of cartridge 187 moves upward and is brought in tight contact with the lower surface of seal 197 by the biasing force of spring 199, thereby preventing ink 45 in cartridge 187 from being leaked therefrom.

It should be noted that in this embodiment, tank 185 has a volume of about 100 cc, and except for tube 193, is formed of a non-transparent material in consideration of weather resistance. About 2,000 to 5,000 A4-size sheeets can be printed at a normal recording density using about 100 cc of ink. Film cartridge 187 is preferably replaced after about 100,000 A4-size sheets are printed or after about 3 years have passed. Replacement is necessary due to clogging of small holes 9 of film 7 by paper dust, mold, dried ink, and the like. For this purpose, cartridge 187 and tank 185 are separately arranged. In addition, with the above structure, leakage or evaporation of ink 45 from tank 185 can be prevented.

Mounting of film cartridge 187 on printer 107 will be described.

In printer 107, thermal head 15 is fixed to housing 85, and a window 233 (shown in FIG. 16) is formed in container portion 211 positioned at a film exposing portion 235 of cartridge 187. Therefore, thermal head 15 can be inserted therethrough to be set on housing 85.

As shown in FIG. 12, a first supporting portion 237 of cartridge 187 is inserted in housing 85, and a second supporting portion 239 thereof at its other end is pushed downward. In this case, a cartridge fixing spring 241 is moved to the right in FIG. 12, and the recess portion of second supporting portion 239 is engaged with the head portion of spring 241, thereby fixing the cartridge.

With the above arrangement of this embodiment, container 211 of cartridge 187 has a window, thus providing sufficient mechanical strength to cartridge 187.

As described above, cartridge 187 can be easily mounted or demounted, even if ink tank 185 is mounted thereon. The color of ink 45 can be changed simply by replacing cartridge 187. When cartridge 187 is mounted or demounted, guide plate 149 pivots upward as indicated by arrow $A_2$ in FIG. 11, and guide 153 pivots as indicated by arrow $B_2$, to widely open the upper portion of cartridge 187. This allows easy removal of jammed paper in paper convey unit 119 and paper dust attached to film 43, and facilitates replacement of cartridge 187.

Figure 16:
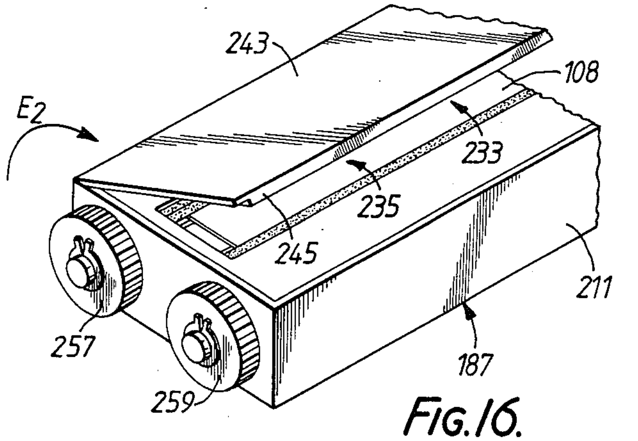
FIG. 16 is a partial perspective view of a film cartridge.

When cartridge 187 is demounted, in order to prevent leakage or evaporation of remaining ink 45 in cartridge 187, a cartridge cover 243 is pivotally hinged on film exposing portion 235 of cartridge 187, as shown in FIG. 16. The cover 243 pivots to cover film exposing portion 235, as indicated by arrow $E_2$. A projection 245 of cover 243 is in tight contact with excessive ink removing members 221, 223, 225 and 227, thus providing a seal to cartridge 187.

As shown in FIG. 11, in this embodiment, a pair of ink absorbing members 247 and 249 are arranged to be in contact with the lower portion of thermal head 15, thereby absorbing ink 45 flowing along the wall of thermal head 15. Therefore, ink leakage from head 15 can also be prevented.

The drive operation of ink film 43 will now be described.

Figure 14:
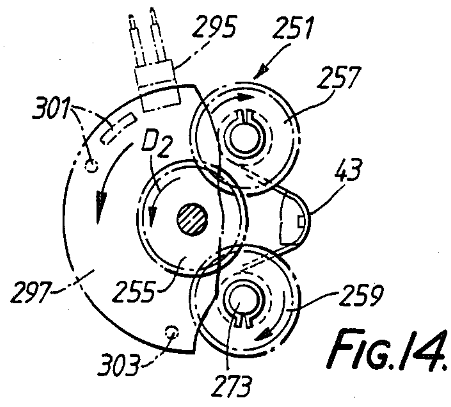
FIG. 14 is a side view showing a main portion of a film convey unit of the printer shown in FIG. 11.
Figure 15:
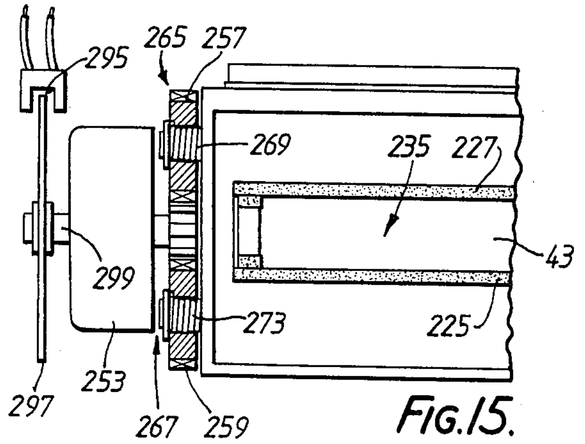
FIG. 15 is a plan view of the film convey unit shown in FIG. 14.

FIG. 14 is a side view of a film drive mechanism 251 as a printing medium drive mechanism, and FIG. 15 is a plan view thereof. Film drive mechanism 251 comprises a film drive motor 253 and a gear 255 mounted on the shaft of motor 253. Gear 255 is meshed with gears 257 and 259 of a pair of rolls 261 and 263 (shown in FIG. 17) around which film 43 is wound. One-way clutch 265 is interposed between roll 261 and gear 257, and one-way clutch 267 is similarly interposed between roll 263 and gear 259. Note that motor 263 can be rotated in the reverse direction, and ink film 43 can be moved upward or downward in FIG. 14.

As shown in FIG. 17, one end of a left-wound spring 269 is fitted in film roll 261. This end is engaged with the recess portion of gear 257. When gear 257 is rotated clockwise, spring 269 is more tightly wound around roll 261, thus transmitting power from gear 257 to roll 261.

In this case, gear 259 causes a right-wound spring 273 fitted in roll 263 to be loosened from roll 263. In this embodiment, however, since roll 263 and spring 273 are rotated in the same direction, they slip.

When film cartridge 187 is mounted or demounted, since gears 257 and 259 are separately meshed with motor gear 255, film 43 may be kept slack or an excessive tension may be continuously applied thereto. In the latter case, film roll 263 and spring 273 can slip to alleviate excessive tension.

As shown in FIG. 17, cartridge 187 is provided with a film tension mechanism 275 for applying a given tension to film 43 at the side opposite rolls 261 and 263. Film tension mechanism 275 removes slack in film 43, and causes film 43 to be pressed against heating elements 21 of thermal head 15 at an appropriate pressure. A ladder wheel 277 is fixed to one end of roll 261 by a pin 279, and a left-hand wound torsion spring 281 is fitted in one end portion 283 of roll 263. The other end of torsion spring 281 is engaged with a notch portion 285 of a ladder wheel 287, which is coupled to wheel 277 through a ladder chain 289. Referring to FIG. 17, torsion spring 281 is twisted so that roll 263 is biased counterclockwise, and roll 261 is biased thereby clockwise when ladder chain 289 is looped between ladder wheels 277 and 287. Therefore, an appropriate tension can be applied to film 43 in accordance with a torsion force (i.e., torque) from torsion spring 281. As a result, when film 43 is mounted on printer 107, it can be slidably moved into tight contact with the distal end portion of head 15 at an appropriate pressure without being slackened.

A case will be described wherein gear 255 is rotated counterclockwise in FIG. 14.

In this case, gear 259 is rotated clockwise, and spring 273 is operated to be tightly wound around roll 263. Then, film 43 is moved in a direction to be taken up by roll 263. In this way, upon clockwise or counterclockwise rotation of motor 253, film 43 is reciprocated. In this embodiment, slackening of film 43 can be prevented by the operation of springs 273 and 269 and mechanism 275 when cartridge 187 is mounted or demounted. Thus, film 43 or thermal head 15 will not be damaged due to excessive tension.

Figure 18:
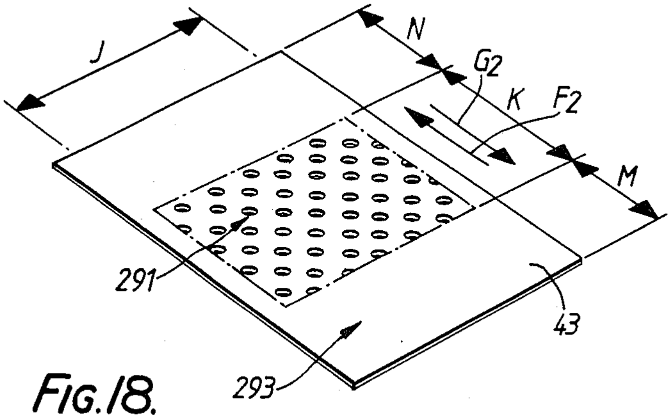
FIG. 18 is a partial perspective view of the ink film.

As shown in FIG. 18, a first region 291 having a large number of holes 47 and second regions 293, which have no holes and are formed at both sides thereof, are formed on film 43. When the printing operation is performed, first region 291 must face heating elements 21. When the printing operation begins, the front end portion of region 291 in the film moving direction reaches heating elements 21. Film position detection mechanism 295, as shown in FIG. 14, which detects the front and rear end portions of first region 291 of film 43, is provided in the film drive mechanism 251.

As shown in FIGS. 14 and 15, in position detector 295, a detection wheel 297 for detecting a film position is mounted on a drive shaft 299 of motor 253. In detection wheel 297, first and second slits 301 and 303 are formed at positions corresponding to two boundary portions of region 291 of film 43, i.e., the front and rear end portions in the film moving direction. First slit 301 consists of an elongated hole and a round hole, and second slit 303 consists only of a round hole. Position detector 295 for detecting the positions of slits 301 and 303 with light is arranged to sandwich the edge portion of wheel 297.

When motor 253 is rotated, position detector 295 senses short and long light pulses formed by the holes of slit 301, and compares them with a constant clock pulse incorporated in electric control circuit 305 (FIG. 11). As a result, detector 295 detects at the rear end of the elongated hole along the clockwise direction that the detected slit is first slit 301. When detector 295 senses a single light pulse transmitted through slit 303, it can detect that the detected slit is second slit 303. Motor 253 receives a stop signal from control circuit 305 when detector 295 detects first slit 301.

When motor 253 stopped, second region 293 of film 43 (FIG. 18) covers film exposing portion 235 of cartridge 187, and first region 291 is stored in ink storage 189 below ink removing members 225 and 223. Since cartridge 187 is covered with second region 293, it can be sealed from the outer atmosphere.

In this way, evaporation of ink 45 in cartridge 187, which causes an increase in viscosity of ink 45, can be prevented. If the viscosity of ink 45 is increased, the ejection speed of ink droplets from holes 47 is decreased or, in the worst case, ejection therefrom is precluded.

Print unit 167 receives a printing command from data processing apparatus (not shown), connected to printer 107, for processing image or character data, and drives first feed rollers 89 to supply recording sheet 83 to paper convey unit 119. When motor 253 is rotated counterclockwise in the direction indicated by arrow $D_2$ in FIG. 14 by a predetermined number of pulses, film 43 is moved for a predetermined period of time. The front end portion of region 291 of film 43 in the film moving direction is thus positioned at heating elements 21, and awaits arrival of recording sheet 83 to coincide with the front edge of sheet 83. Thereafter, film 43 is moved in synchronism with movement of sheet 83. The moving speed of film 43 (20 mm/sec) is half that of sheet 83 (40 mm/sec).

Figure 19:
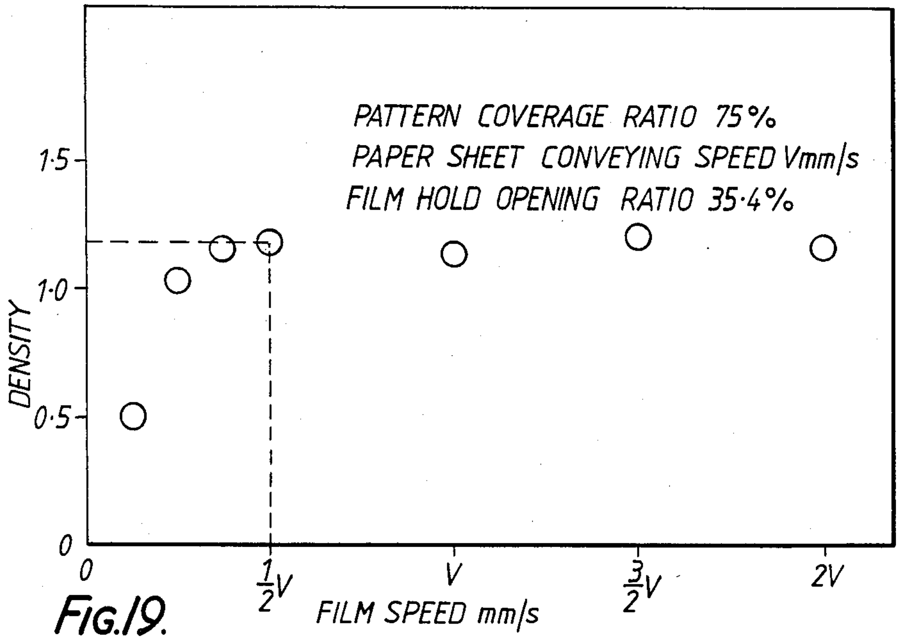
FIG. 19 is a graph showing the relationship between a film speed and a recording density according to an embodiment of the present invention.

As shown in FIG. 19, when the moving speed of sheet 83 is varied within the range of 10 to 100 mm/sec, if the moving speed of film 43 is V/4 or higher with respect to moving speed V of sheet 83, the recording density of sheet 83 can be 1.0 or more (black solid, hole opening ratio 34.5%, coverage ratio of the printing portion to the sheet 75%) regardless of the moving direction of sheet 83 relative to film 43. Note that the hole opening ratio is the ratio of hole area to film area.

Therefore, the moving distance of film 43 can be made shorter than the recording length (recording direction) of sheet 83, the area of first region 291 of film 43 can be reduced, and film 43 can be more easily manufactured. If first region 291 of film 43 has a large area, it is difficult to form uniform-diameter holes (25 to 30 μm) over the entire area of region 291. Therefore, the diameter of holes 47 is reduced at, e.g., surrounding portions, resulting in irregular recording density. However, in this embodiment, the area of first region 291 of film 43 can be reduced, thus obtaining a more regular, uniform image.

When film 43 is subsequently moved, the rear end of first region 291 reaches heating elements 21 from the side of removing members 223 and 225. Film position detector 295 then detects second slit 303. In this case, in order to satisfy the above relationship between the respective positions of film 43 and first and second slits 301 and 303 of wheel 297, film 43 must be wound on the side of members 223 and 225 upon setting of cartridge 187. In addition, motor 253 must be stopped upon detection of the round hole of first slit 301 by detector 295.

When sheets 83 are continuously supplied and the nth sheet 83 (n is an even integer) is recorded with an image, film 43 is wound until the rear end of first region 291 of film 43 on the side of members 223 and 225 reaches roll 261. Then film 43 is filled with ink 45. Thereafter, film 43 is moved in a direction opposite to the film moving direction as described above. Movement is delayed for a predetermined period of time until arrival of the rear end of first region 291 to align the front end of sheet 83 with the rear end of region 291. Film 43 and sheet 83 are then fed in synchronism with each other for recording.

When the (n+1)th sheet 83 is to be recorded, the other end of region 291 on the side of members 221 and 227 is wound around roll 263 to be filled with ink 45, and is then returned to heating elements 21. After the corresponding end of first region 291 of film 43 is aligned with the front edge of sheet 83, film 43 is moved.

Since the recording operation is performed by the alternating movement of film 43, continuous recording is possible.

Excessive ink removing members 221, 223, 225 and 227 are alternately arranged to be in contact with film 43, and members 225 and 227 are arranged above members 221 and 223.

Since film rolls 261 and 263 are arranged below the top of thermal head 15, print unit 167 can be made more compact, and sheet 83 can be conveyed while definitely maintaining a gap between sheet 83 and heating elements 21. In addition, when rolls 261 and 263 are arranged below members 221 and 223 at the side of thermal head 15, the distance between members 225 and 227 can be reduced, and the area of film exposing portion 235 can also be reduced. Therefore, a more compact film cartridge 187 can be used.

A case will be described wherein film 43 is moved in the direction indicated by arrow $G_2$ in FIG. 17. Film 43 filled with ink 45 through ink storage 189 is moved upward, and excessive ink is removed from film 43 by excessive ink removing member 221. However, during the recording operation, since first region 291 of film 43 passes by member 221, excessive ink is moved by a constant amount to the side opposite thermal head 15 through first region 291.

Ink moved to the opposite side is removed by excessive ink removing member 227, and is then transferred to the side of thermal head 15. When film 43 is moved in the direction indicated by arrow $G_2$ and region 291 passes by members 221 and 227, a sufficient amount of ink 45 can be coated not only on holes 47, but also on the entire surface of film 43. Therefore, the film moving speed may be reduced to ½ that of sheet 83.

A case will be described when region 291 of film 43 is moved upward along members 221 and 227. First, ink on the recording surface side of film 43 is removed by member 227. Therefore, dust or paper powder attached to film 43 is removed along with any excessive ink attached thereto. In this case, ink left on the distal end portion of member 227 is moved to the side of thermal head 15 through holes 47 of first region 291, and is again removed by member 221, thus being left on the distal end portion of member 221.

Ink removed and left on the distal end portion of member 221 is then moved to the side opposite to thermal head 15 through holes 47 of region 291. In this way, excessive ink is recovered in ink storage 189 of cartridge 187.

When second region 293 of film 43 passes by members 221 and 227 in the direction indicated by arrow $F_2$ in FIG. 17 (i.e., downward), the surface of film 43 opposite to thermal head 15 has already been cleaned by member 225, and need not be cleaned further by member 227. However, paper powder and rubber dust are deposited on the distal end portion of member 227.

The surface of film 43 at the side of head 15 is also cleaned by member 223, and need not be cleaned by member 221.

When first region 291 of film 43 covers film exposing portion 235 of cartridge 187, the exposed portion of film 43 is cleaned, and the operator need not soil his hands with ink.

As shown in FIG. 18, since lengths M and N of second regions 293 of film 43 are set to be longer than film exposiing width E (FIG. 17) of cartridge 187, air communication through a gap between excessive ink removing members 221, 223, 225 and 229 can be prevented. Thus, ink can be protected from evaporation, and the viscosity thereof can be kept unchanged. This helps to provide a clear image.

An operation for removing paper dust adhered to film 43 will be described.

When film 43 is moved in the direction indicated by arrow $G_2$ (FIG. 17), paper powder and dust attached to the distal end portion of member 227 are also moved together with film 43 and until they reach heating elements 21 of head 15. Film 43 is clamped between heating elements 21, and is slightly reciprocated several times. At the same time, a suction fan 307 (FIG. 12) is energized to attract paper particles or dust on film 43, and this draws them into an air-suction guide 309 through a suction hole 311 (FIG. 13) of belt 117.

As a result, paper powder or dust adhered to film 43 can be removed, thus preventing clogging of holes 47 of first region 291 of film 43.

In this embodiment, since the paper-powder is removed within about thirty seconds after a series of successive recording operations, the print operation is not adversely affected.

When second region 293 of film 43 is exposed from cartridge 187, the paper-powder removing procedure is carried out. Therefore, ink will not be drawn into guide 309, nor become attached to belt 117.

The operation of film 43 after a series of recording operations by print unit 167 will now be described.

After a series of recording operations is completed, film 43 is moved at a lower speed than in the recording mode for a predetermined period of time (several seconds). This prevents ink 45 from being dried by heat from heating elements 21 of head 15 before the recording operation is completed. Next, the paper-powder removing procedure is carried out for about 10 seconds, and film exposing portion 235 of cartridge 187 is then covered with region 293 of film 43.

Excessive ink removing members 221 and 223 are formed of an elastic member, and the edges thereof at the side of thermal head 15 are in tight contact with thermal head 15 at the lower surface of film 43. As a result, ink 45 flowing down along the wall of head 15 can be recovered in ink storage 189 of cartridge 187 through holes 47 of region 291 of film 43. Since members 221, 223, 225 and 227 are formed of a material that is impermeable to air, communication between ink inside cartridge 187 and air outside cartridge 187 is prevented.

The relationship between the diameter of holes 47 of film 43 and the pitch therebetween now will be explained with reference to FIG. 20.

Figure 20:
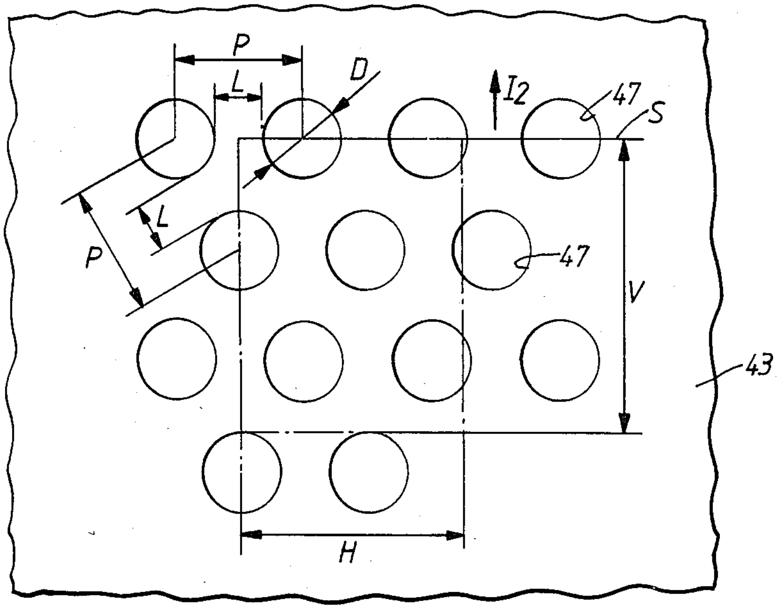
FIG. 20 is a partial plan view of the ink film.

Referring to FIG. 20, arrow $I_2$ indicates the moving direction of film 43, and three adjacent holes 47 are arranged to form an equilateral triangle. In FIG. 20, reference symbols H and V indicate dimensions of heating elements 21, which are respectively 100 $\mu$m to 125 $\mu$m. Reference symbol D denotes the diameter of hole 47, which is 25 $\mu$m; P, the pitch between the centers of adjacent holes 47, which is 45 $\mu$m; and L, the minimum distance between adjacent holes 47, which is 20 $\mu$m. From tests, it was found that when a maximum distance between adjacent holes 47 was given by P, relations $H \geqq 2P$ and $V \geqq 2P+D$ were satisfied. In addition, in the case of a resolution of 8 lines/mm, when diameter D of holes 47 fell within the range of D=15 to 35 $\mu$m and P fell within the range of P=40 to 50 $\mu$m, good printing quality could be obtained.

The present invention has been described with respect to a specific embodiment. However, other embodiments such as heat-sensitive type printers, thermal transfer type printers etc. based on the principles of the present invention should be obvious to those of ordinary skill in the art. Such embodiments are intended to be covered by the claims.

What is claimed is:

1. A thermal head for an image forming apparatus including a movable image formation sheet, said thermal head comprising:

(a) a rod member having an elongated, curved, circumferential surface;

(b) heating means comprising a plurality of heating elements disposed on said rod member in the elongated direction thereof for applying heat to the movable image formation sheet;

(c) a plurality of lead electrodes attached to said rod member in the circumferential direction thereof, one end of each one of said plurality of lead electrodes being connected to a corresponding one of said plurality of heating elements and the other end of each one of said plurality of lead electrodes having a connecting portion;

(d) a supporting member for supporting said rod member when the movable image formation sheet is moving across said rod member; and (e) an integrated circuit having a plurality of connecting terminals thereon, each one of said plurality of connecting terminals being connected to said connecting portion of a corresponding one of said plurality of lead electrodes, said integrated circuit being adapted to individually energize each one of said plurality of heating elements through the corresponding one of said plurality of lead electrodes in response to an image signal, each one of said plurality of connecting terminals of said integrated circuit and said connecting portion of the corresponding one of said plurality of lead electrodes being on at least substantially the same plane.

2. The thermal head of claim 1 and further including a base plate member mounted on said supporting member and includiing a plurality of wiring patterns thereon for feeding the image signal to said integrated circuit, each one of said plurality of wiring patterns having a connecting portion which is on at least substantially the same plane with said plurality of connecting terminals of said integrated circuit.

3. The thermal head of claim 2 and further comprising a connecting sheet electrically connecting each connecting portion of said plurality of lead electrodes, each connecting terminal of said integrated circuit, and each connecting portion of said plurality of wiring patterns on said base plate member.

4. The thermal head of claim 1 and further including a protection layer on said plurality of heating elements and on said plurality of lead electrodes.

5. The thermal head of claim 1 wherein said plurality of lead electrodes includes a common electrode and a drive electrode.

6. The thermal head of claim 5 wherein said drive electrode extends from a corresponding one of said plurality of heating elements in a circumferential direction about said rod member.

7. The thermal head of claim 6 wherein said common electrode extends from said plurality of heating elements along the surface of said rod member in the circumferential direction opposite to the direction of said drive electrode.

8. The thermal head of claim 3 wherein said connecting sheet includes a flexible film having said plurality of wiring patterns formed thereon.

9. The thermal head of claim 8 wherein said connecting sheet includes a plurality of solder layers, each one of said plurality of solder layers corresponding to said connecting portion of a corresponding one of said plurality of wiring patterns and to a corresponding one of said plurality of lead electrodes, the size of each one of said plurality of solder layers being smaller than said connection portion of the corresponding one of said plurality of lead electrodes.

10. The thermal head of claim 8 and further including a seal layer on said supporting member for sealing the flexible film and said integrated circuit.

11. The thermal head of claim 10 wherein:

(a) said connecting sheet has a backside and (b) said connecting sheet includes means for permitting a seal material of said seal layer to enter into the backside of said connecting sheet when said seal layer is formed.

12. The thermal head of claim 1 wherein said rod member includes molybdenum.

13. The thermal head of claim 1 wherein said supporting member includes aluminum.

14. The thermal head of claim 12 wherein said rod member includes an insulation layer of glazed glass thereon, said plurality of heating elements being arranged on said insulation layer.

15. An image forming apparatus comprising:

(a) a thermal head including:

(i) a supporting member; (ii) a rod-shaped member attached to one end of said supporting member;

(iii) a plurality of heating elements arranged on said rod-shaped member in an axial direction of said rod-shaped member;

(iv) a plurality of lead electrodes formed on said rod-shaped member, each one of said plurality of lead electrodes having an individual connecting portion connected to a corresponding one of said plurality of heating elements;

(v) an integrated circuit having a plurality of connecting terminals mounted on said supporting member, each one of said plurality of connecting terminals being connected to said connecting portion of a corresponding one of said plurality of lead electrodes, said integrated circuit being adapted to individually energize each one of said plurality of heating elements through the corresponding one of said plurality of lead electrodes in response to an image signal, each one of said plurality of connecting terminals of said integrated circuit being on at least substantially the same plane with said connecting portion of the corresponding one of said plurality of lead electrodes; and (vi) a connecting sheet electrically connecting each connecting portion of said plurality of lead electrodes and each connecting terminal of said integrated circuit;

(b) means for feeding a sheet to said thermal head; and (c) means for supplying the image signal to said integrated circuit, thereby causing a visible image corresponding to the image signal on the sheet.

16. The image forming apparatus of claim 15 and further includiing an image formation sheet made from a hydrophilic material.

17. The image forming apparatus of claim 16 wherein said image formation sheet has a plurality of holes therein, the diameter of each one of said plurality of holes being between about 5 μm and about 500 μm.

18. The image forming apparatus of claim 16 wherein said image formation sheet includes a coating of polyethylene.

* * * * *